(12) United States Patent
Zhang et al.

(10) Patent No.: US 8,688,723 B2
(45) Date of Patent: Apr. 1, 2014

(54) METHODS AND APPARATUS USING RANGE QUERIES FOR MULTI-DIMENSIONAL DATA IN A DATABASE

(75) Inventors: Bin Zhang, Fremont, CA (US); William K. Wilkinson, Sunnyvale, CA (US); Sachin Kulkarni, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 992 days.

(21) Appl. No.: 12/241,305

(22) Filed: Sep. 30, 2008

(65) Prior Publication Data

US 2010/0082654 A1    Apr. 1, 2010

Related U.S. Application Data

(60) Provisional application No. 61/016,147, filed on Dec. 21, 2007.

(51) Int. Cl.
*G06F 17/30* (2006.01)
(52) U.S. Cl.
USPC .......................................... 707/758; 707/705
(58) Field of Classification Search
USPC .................... 707/999.004, 705, 758
See application file for complete search history.

(56) References Cited

U.S. PATENT DOCUMENTS

| | | | |
|---|---|---|---|
| 6,326,964 B1 | 12/2001 | Snyder | |
| 7,117,217 B2 | 10/2006 | Ooi | |
| 7,325,001 B2 | 1/2008 | Goldstein | |
| 8,055,687 B2 | 11/2011 | Zhang | |
| 8,219,564 B1 * | 7/2012 | Shao et al. | 707/743 |
| 2003/0004938 A1 | 1/2003 | Lawder | |
| 2004/0177065 A1 * | 9/2004 | Tropf | 707/3 |
| 2004/0210624 A1 * | 10/2004 | Andrzejak et al. | 709/201 |
| 2005/0050060 A1 * | 3/2005 | Damm et al. | 707/100 |
| 2005/0086648 A1 * | 4/2005 | Andrews et al. | 717/135 |
| 2006/0098009 A1 * | 5/2006 | Zuniga | 345/421 |
| 2007/0073759 A1 * | 3/2007 | El-Sabbagh | 707/102 |
| 2007/0237410 A1 | 10/2007 | Cormode | |
| 2007/0239706 A1 * | 10/2007 | Zhang et al. | 707/5 |
| 2009/0327373 A1 * | 12/2009 | Chacko et al. | 707/206 |
| 2010/0082654 A1 | 4/2010 | Zhang | |

OTHER PUBLICATIONS

Fenk et al.; Sep. 2000; Database Engineering and Applications Symposium, 2000 International; on pp. 179-187.*
Ramsak et al.; Proceedings of the 26th International Conference on Very Large Databases, Cairo, Egypt, 2000; p. 263-272.*
Article entitled "On Range Queries in Universal B-Trees", copyright 2003.*
Article entitled "A New Range Query Algorithm for Universal B-Trees", copyright 2005, by Skopal et al.*
Article entitled "Advanced Concepts and Applications of the UB-Tree", dated Jul. 2, 2005, by Widhopf-Fenk.*
Article entitled "Benchmarking the UB-Tree", dated 2003, by Kratky et al.*

(Continued)

*Primary Examiner* — Mahesh Dwivedi (57) ABSTRACT

Embodiments include methods, apparatus, and systems for using range queries in multidimensional data in a database. One embodiment is a method that defines a query box from a search for multidimensional data in a database. The method examines an intersection between a Z-interval and the query box by decomposing the Z-interval into hyper-boxes that are also Z-intervals in Z space. Items in the query box that match the search are discovered.

16 Claims, 3 Drawing Sheets

(56) References Cited

OTHER PUBLICATIONS

Article entitled A Self-Adaptive Model to Improve Average Response Time of Multiple-Event Filtering for Pub/Sub System, by Wang et al., Copyright 2005.*

Article entitled B-trees: Bearing Fruits of All Kinds, by Ooi et al., Copyright 2001.*

Article entitled "Range Nearest-Neighbor Query", by Hu et al., published on Nov. 18, 2005.*

U.S. Appl. No. 12/356,479, Non-Final Rejection dated Mar. 4, 2011, pp. 1-12 and attachments.

U.S. Appl. No. 12/356,479, Notice of Allowance dated Sep. 2, 2011, pp. 1-7 and attachments.

* cited by examiner

METHODS AND APPARATUS USING RANGE QUERIES FOR MULTI-DIMENSIONAL DATA IN A DATABASE

CROSS REFERENCE TO RELATED APPLICATIONS

This Application claims the benefit of U.S. Provisional Application Ser. No. 61/016,147, filed Dec. 21, 2007, titled "Methods And Apparatus Using Range Queries For Multi-dimensional Data In A Database" which is hereby incorporated by reference herein as if reproduced in full below.

BACKGROUND

Databases are electronic filing systems that store records or data in a computer system. Computer programs or users can send and retrieve data from the database using a database management system (DBMS).

The amount of data stored in database systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Some database systems store data using multiple attributes or dimensions. These multidimensional databases enable vast amounts of data to be stored. At the same time, such multidimensional databases pose challenges to efficiently locate and retrieve data in a timely fashion.

DETAILED DESCRIPTION

Exemplary embodiments are directed to apparatus, systems, and methods for using range queries for multidimensional indexing structures. One embodiment uses a depth-first-search (DFS) range query on high dimensional indexing structures to locate data in a multidimensional database.

One exemplary embodiment constructs a multidimensional indexing tree structure that is based on a space filling curve. The embodiment uses a depth-first search to find all the records stored in the tree that fall in a hyper-rectangular shaped sub-space, which is called a query box and is provided by the user. A bit-level design allows efficient decomposition of any portion of the space-filling curve into hyper-rectangular boxes that are also Z-intervals. Each such hyperboxes can be checked with the query box for intersection. An interval along the space-filling curve is called a Z-interval.

One embodiment discovers all the records that fall into a hyper-rectangular query box in a high dimensional indexing tree under a clustering organization of the data introduced by a space filling curve. In this ordering of data, the query box no longer has a simple structure. Instead, the query box includes many disjoint Z-intervals along the space filling curve. This structure provides an efficient way of finding all the data items in the query box along the space filling curve that satisfy or match the search query. Discovered data items satisfying or matching the search query are transmitted or provided to a user.

Exemplary embodiments are used in multidimensional or high dimensional indexing structures of databases. Such databases are often queried by specifying a range in each dimension (for example, with a rectangular query box) and finding all the data items that fall in this rectangular query box. Exemplary embodiments use a special kind of index based on space filling curves. Further, a special DFS range query algorithm is used which has detailed bitwise level designs.

Figure 1:
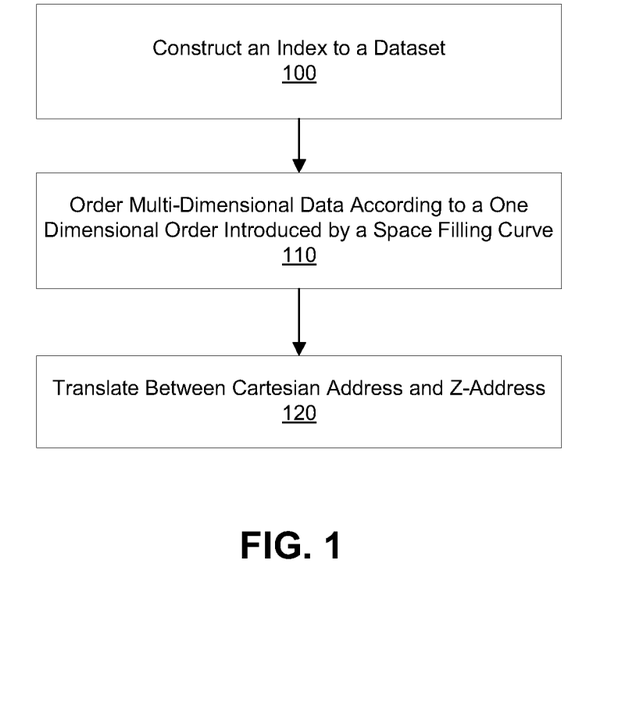
FIG. 1 is a flow diagram for constructing a multidimensional indexing tree structure that is based on a space filling curve in accordance with an exemplary embodiment.

FIG. 1 is a flow diagram for constructing a multidimensional indexing tree structure that is based on a space filling curve in accordance with an exemplary embodiment.

According to block 100, indexes are constructed to datasets for data in multidimensional or high dimensional databases.

One exemplary embodiment uses a multi or high dimensional data set that has a tabular form (for example, a table using rows and columns). Each row is a data item and each column is a dimension (or an attribute). A high dimensional data set is usually represented by a high dimensional discrete vector space as follows:

$$\Omega = D_1 \times D_2 \times \ldots \times D_n.$$

In this equation, each $D_i$ is an one-dimensional space, and n is called the dimensionality of the data set.

An index to the data set $\Omega$ is constructed on a subset of columns, called sorting key of $\Omega$. The sorting key could include all columns of $\Omega$. If more than one column is included in the sorting key, it is called a composite sorting key. As one example, an index structure is a B-Tree index, which sorts the data set by the sorting key (or composite sorting key) and arranges the sorted items into a tree structure.

One problem with B-Tree is that the ordering of the individual columns in the composite sorting key defines the kind of queries for which the tree is adequate (alternatively, has acceptable performance). The order of the columns in the composite sorting key defines the significance of the column in its influence on the sorting order. The order of two data items is determined by the most significant column in the index in which the attribute values of these two data items differ. Less significant columns in the composite sorting key have less or no influence to the order of these two data items. Different queries demand different orderings of the columns in the composite sorting key, and these different orderings necessitate many secondary B-Tree indices being created to efficiently support queries for various orderings.

According to block 110, multi-dimensional data is ordered according to a one dimensional order introduced by a space filling curve.

Ordering high dimensional data can occur according to a one dimensional order introduced by a space filling curve. For example, an indexing tree structure, called Universal B-Tree, solves the problem of B-Trees by introducing a new sort order that does not significantly favor any column in the composite sorting key. Such symmetry is introduced by using a space filling curve to determine the sort order.

Figure 2:
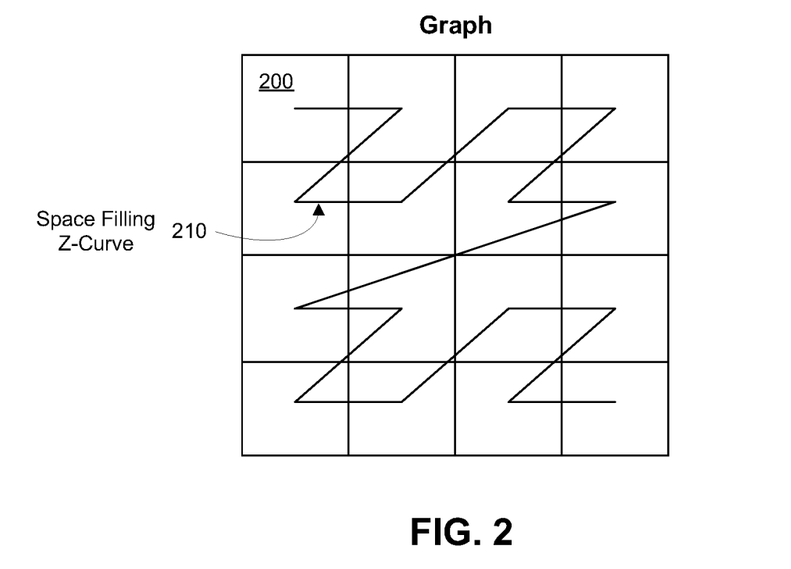
FIG. 2 is a graph of a space filling Z-curve in accordance with an exemplary embodiment.

FIG. 2 is a graph 200 of a space filling Z-curve 210 in accordance with an exemplary embodiment. One exemplary embodiment is discussed using a particular space filling curve, called Z-ordering. Exemplary embodiments, however, are not limited to just this single type of space filling curve. With minor variations in the details, exemplary embodiments can use other space filling curves.

The space filling curve transforms the high dimensional space into a one-dimensional space. For example, with the Z-curve 210, the data items are ordered in this Z-ordering. Each data item has an one-dimensional Z-address derived from its high dimensional Cartesian address. A B-Tree index is applied to the one-dimensional Z-addresses. The Z-ordering provides a strong locality of the data items in this ordering in the Cartesian space, which matches better with the locality of query boxes.

According to block 120, the Cartesian addresses are translated to Z-addresses.

In one embodiment, a translation occurs between the Cartesian address and Z-address. For example, let the binary representation of the data items in $D_i$ be (where each little o represents a single binary bit):

$$o_i = o_{i,0} o_{i,1} \ldots o_{i,s-1}.$$

In this equation, s is the number of bits, and 0 represents the most significant bit. For simplicity of presentation, exemplary embodiments assume that the same s applies to all dimensions. The Cartesian address of a data item in $\Omega$ is written as:

$$o = (o_1, o_2, \ldots, o_n).$$

In this equation, the ordering of the dimensions does not matter in principle, unlike a conventional B-Tree, because of the way Z-addresses are constructed. The Z-address of this data item is defined by interleaving the bits of the component addresses in this vector:

$$z(o) = o_{1,0} o_{2,0} \ldots o_{n,0} o_{1,1} o_{2,1} \ldots o_{n,1} \ldots$$
$$o_{1,s-1} o_{2,s-1} \ldots o_{n,s-1}.$$

This Z-address is used to sort the data and a conventional B-Tree is constructed on the sorted Z-addresses. Such a B-Tree together with a new range query algorithm is called a Universal B-Tree (UB-Tree). Other than the range query algorithm, UB-Tree operations are similar to the operations of the B-Tree. By way of example, such operations include: insert, delete, node split, node merge, initial build of the tree, etc. All of these are similar to the B-Tree operations except with a wrapping of a bidirectional address translation between Cartesian address and Z-address.

Figure 3:
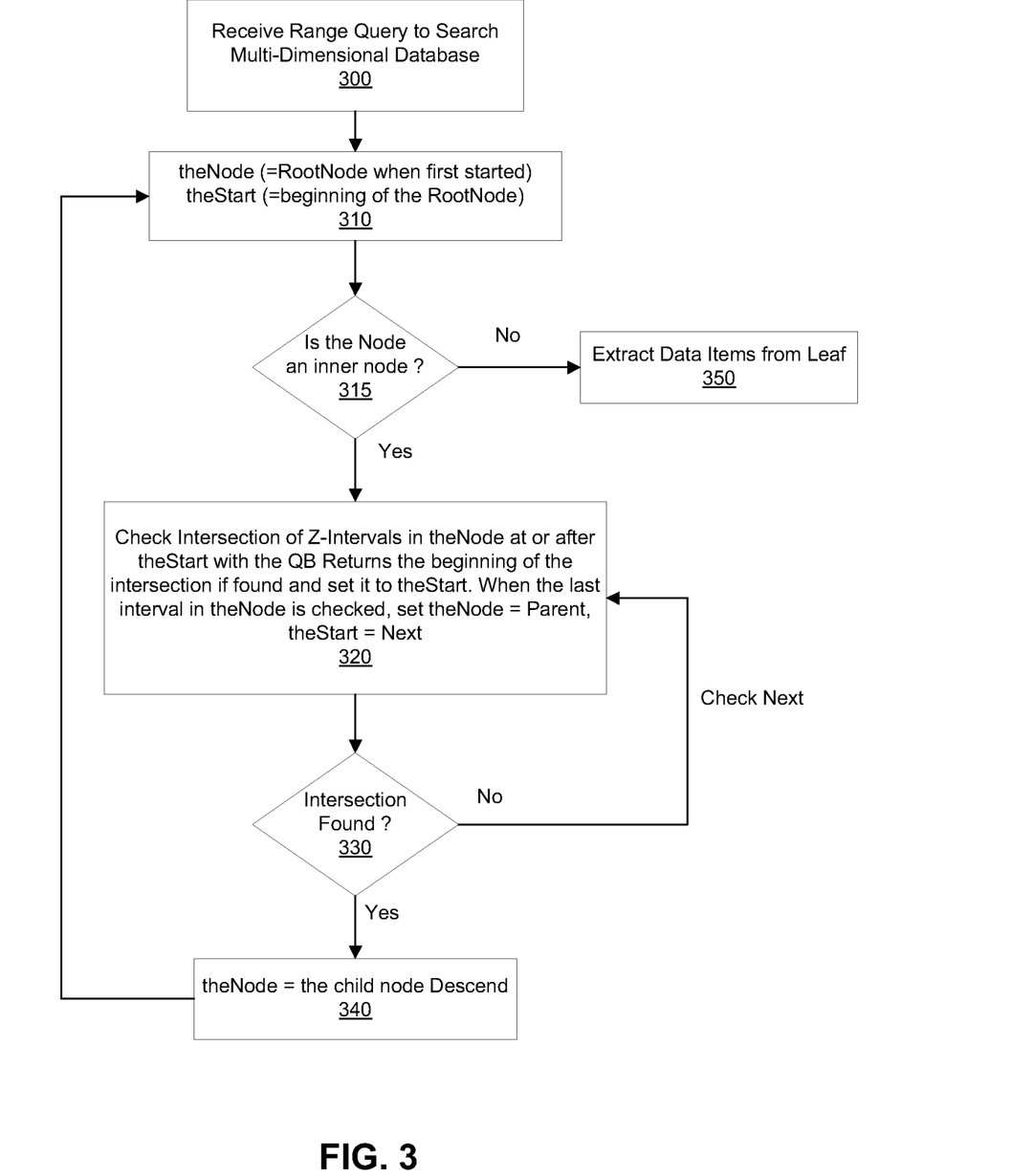
FIG. 3 is a flow diagram for ascending and descending a multidimensional database while searching a range query in accordance with an exemplary embodiment.

FIG. 3 is a flow diagram for ascending and descending a multidimensional database while searching a range query in accordance with an exemplary embodiment.

According to block 300, a range query is received to search a multi-dimensional database.

A range query is a retrieval of all data items in a given query box specified in Cartesian address by the following:

$$a_i \leq x_i \leq b_i, \ i = 1, \ldots, n.$$

In one embodiment, a query need not specify a value range for each dimension. Without loss of generality, exemplary embodiments assume that each dimension is specified in the query box. Two points on the "main diagonal", $a = (a_1, a_2, \ldots, a_n)$ and $b = (b_1, b_2, \ldots, b_n)$, define the query box, which is a hyper-rectangular prism in the n-dimensional space D.

Figure 4:
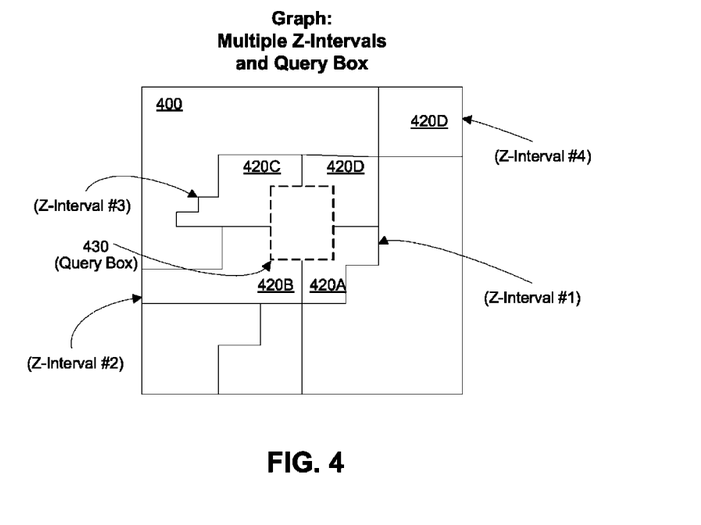
FIG. 4 is a graph of four Z-intervals and a query box in accordance with an exemplary embodiment.

Complications of processing a range query come from the fact that data items are sorted by their Z-address. As such, there is no simple alignment between a Z-address interval (Z-interval) and a query box. FIG. 4 illustrates one example situation.

FIG. 4 is a graph 400 of a multiple Z-intervals and a query box in accordance with an exemplary embodiment. By way of illustration, four Z-intervals 420A, 420B, 420C, and 420D and query box 430 (illustrated with a dashed line) are shown.

Since data are sorted by Z-address in the UB-Tree, every node in the UB-Tree, leaf or inner node, covers a Z-interval. Whether to search a sub-tree in the UB-Tree is determined by the intersection between the query box and the Z-interval covered by the root of the sub-tree. If they intersect, the sub-tree is searched. Otherwise, the sub-tree is pruned from the search.

Exemplary embodiments provide the bitwise algorithm for intersection checking after presenting the high level search algorithm called DFS. Further, unlike previous algorithms (which require sibling links and traverses such links), the DFS algorithm in accordance with exemplary embodiments does not require sibling links.

UB-Tree inner nodes contain a sequence of consecutive Z-intervals, where each Z-interval contains the Z-intervals in the corresponding child node. Leaves of the tree contain the individual Z-addresses of the data items.

According to block 310, once the range query is received, the search commences at the root node of the tree structure. Initially, theNode is set to the RootNode when first started, and theStart is set to the beginning of the RootNode.

Then, according to block 315, a question is asked whether the node is an inner node. A determination is made as to whether the Z-interval intersects the query box. If the answer to this question is "no" then flow proceeds to block 350 and data items are extracted from the leaf. If the answer to this question is "yes" then flow proceeds to block 320.

At block 320, a check is made of the intersection of Z-intervals in theNode at or after theStart with the QB and returns the beginning of the intersection if found and sets it to theStart. When the last interval in theNode is checked, set theNode equal to Parent and theStart to Next.

As shown, flow proceeds to block 330 and a question is asked whether an intersection is found. If the answer to this question is "no" then flow proceeds back to block 320 to check the next intersection. If the answer to this question is "yes" then flow proceeds to block 340 wherein theNode equals the child node Descend. Flow then loops back to block 310.

One exemplary embodiment uses a descending phase of the DFS. Starting from the root node, embodiments check the intersection of the Z-intervals in the node from left to right with the query box. A question is asked whether an intersection is found. In other words, does the query box intersect with the current Z-interval? If an intersection is found, descend to the corresponding child node. At the child node, repeat the same intersection checking process. This process is the descending phase of the depth-first traversal of the UB-Tree. The process continues until either a leaf node is reached or at some level, no intersection is found. The second case is possible because the Z-interval in a parent node that intersects with the query box is broken down to a number of Z-intervals in the children with gaps. The intersection detected in the parent could fall into one of these gaps, and therefore no intersection exists in the child. When this situation occurs, ascending phase begins.

When a leaf node is reached, all the data items in the leaf that fall within the query box are returned and then the ascending phase follows. In one embodiment, once the child node, either a leaf or an inner node, is fully examined, the ascending phase begins. DFS goes back to the immediate parent of the current node and starts from the next Z-interval that has not been examined. The ascending phase either calls the descending phase when an intersection is found or calls the ascending phase again if the current node is fully examined. One embodiment expects no disk input/outputs (I/Os) during the ascending phase.

The pseudo-code of DFS can be presented in a variety of embodiments. By way of example, the DFS algorithm is as follows:
Input:
  a query box QB,
  a node, not necessarily the root because we will use this function recursively, and
  a starting Z-position

```
DFS( QB, theNode)
{
    If is_inner_node( theNode ) {
        For each Z-interval in theNode,
        // which corresponds to a ChildNode
            If Intersect( Z-interval, QB )
                call DFS( QB, theChildNode );
        // if no more Z-intervals are to be examined, return to the caller
    }
    Else { // theNode is a leaf
        Return ExtractDataItems(theLeaf, QB);
    }
}.
```

In this algorithm, the ExtractDataItems(theLeaf, QB) is also further divided or broken down into intersection checking of a Z-interval with the query box because the Leaf covers a Z-interval. The function Intersect( ) is further explained below. The DFS algorithm further refined after presenting the bitwise operations for decomposing a Z-interval into a sequence of consecutive hyper-boxes, which are also Z-intervals.

Exemplary embodiments utilize a single pass through of the bits of a and b for the intersection detection. A query box QB is specified by the two vertices on the "main diagonal", a and b (see equation above for the range query specified by Cartesian address). For simplicity of notation, the query box $[a_1,b_1] \times \ldots \times [a_n,b_n]$ is written as [a,b]. When notation [a,b] is used, the points a and b are given in Z-addresses.

A Z-interval $[\alpha,\beta]$, with either of its boundaries included or excluded from the interval, is specified by its two boundary Z-addresses.

Testing the intersection of a Z-interval and a query box is achieved by decomposing the Z-interval into a sequence of Hyper-Boxes. The hyper-boxes are both boxes in the Cartesian space and Z-intervals in the Z space. Such a decomposition can be done in a single pass through the bits of $\alpha$ and $\beta$, the boundaries of the Z-interval.

The following algorithm illustrates the decomposition of a Z-interval into a sequence of hyper-boxes. The algorithm scan the bits of $\alpha$ and $\beta$ only once. The ith bit of $\alpha$ is expressed as $\alpha[i]$, and $\alpha[0]$ is the most significant bit. There are p=n*s number of bits. The algorithm is given in both English sentences and C code.
Input: Z-interval boundaries $\alpha$ and $\beta$;
Output: a sequence of Z-addresses, every neighboring two gives a hyper-box.
Working Variable: v
Bitwise Z-Interval to Hyper-Boxes Conversion Algorithm (Z2H):
Step 0: Finding the first bit where $\alpha$ and $\beta$ differ: i=0; while ($\alpha[i]==\beta[i++]$);
  I=i−1;
  Let I=i; Obtain $\alpha[I]=0$ and $\beta[I]=1$ because $\alpha<\beta$ in Z-address.
  v=$\alpha$; Output v as $v_0$, the first vertex of the sequence of hyper-boxes.

Step 1: Starting from the least significant bit of v, skip all the zero bits:
  i=p; while($\alpha[i--]==0$);
    i++;
Step 2: Continue with the index i position, setting all the consecutive 1's to zero until it reaches a zero in v:
  while(v[i]==1) {v[i--]=0;}
Step 3: Set the encountered 0-bit to 1: v[i]=1; output the vertex v.
Step 4: If i>I, goto Step 2; Else (must be i==I because v[I]=$\alpha$[I]==0) go to Step 5.
Step 5: Find the next 1-bit in $\beta$: while(++i≤p&&$\beta$[i]==0);
Step 6: If i<p=n*s, the total number of bits in a Z-address, set v[i]=1; and output v as a vertex of the sequence of hyper-boxes. If i≥p, DONE.

Let $v_1=\alpha, v_2, \ldots, v_K=\beta$ be the sequence of vertices output from this algorithm. Every neighboring two vertices $[v_i,v_{i+1})$ is both a hyper-box and a Z-interval. They give all the hyper-boxes in sorted order by their Z-addresses.

It is clear that the bits in both $\alpha$ and $\beta$ are scanned only once in the algorithm above and that there will be no more than 2*p hyper-boxes in any Z-interval. This is also clear from a geometric point of view.

Checking the intersection of the Z-interval $[\alpha,\beta]$ with the query box is done by checking the intersection of these hyper-boxes $[v_i,v_{i+1})$, i=1, . . . , K, with the query box. The first intersecting hyper-box is returned as the beginning location of the intersection.

In one exemplary embodiment, the DFS algorithm is improved based on a better start position (theStart). To improve the efficiency of the DFS algorithm, let the function intersect( ) return the beginning vertex of this first intersecting hyper-box. At the child level, a search can continue from this point without repeating the intersection checking on the intervals in the child that are covered by the portion of the interval in the parent that has already been cleared in intersecting with the query box. This improvement makes the DRU's two optimizations using the right neighbor's interval unnecessary. Due to this improvement, the depth first search is used without sibling links and still achieves efficiency, or potentially even higher efficiency.

The improved intersection function API is given as follows:
  Z-Address
    vertex_of_first_intersecting_hyper_box=Intersect (Z-interval,QB).

NULL address is returned by this function if there is no intersection.

An exemplary improved DFS algorithm (named DFS_a) is provided as follows:

```
DFS_a( QB, theNode, start_position )
{
    If is_inner_node(theNode) {
        For each Z-interval [α,β] in the node with β ≥ start_position,
            If (theNextStartPosition = Intersect(Z-interval, QB)) != NULL
                call DFS_a(QB, theChildNode, theNextStartPosition);
    }
    Else { // theNode is a leaf
        Return ExtractDataItems(theLeaf, QB, start_position);
    }
}.
```

In this algorithm, the ExtractDataItems( ) function can also benefit from the testing that is already done in the parent node by adding the start_position as a new parameter.

In DFS, after a node is fully examined, DFS goes back to the parent node (as opposed to going to the sibling if no data item outside the QB is encountered as in DRU). This process provides several benefits. First, the parent node is likely to be in memory because it was visited before the current node, but sibling is mostly likely to require a disk I/O. Second, each Z-interval in the parent node is the union of many Z-intervals in a child. It is more efficient to work with large Z-intervals rather than the small ones to reduce the amount of work on Z-interval to hyper-box conversions. If all the Z-intervals of the sibling are contained in the query box, going to the sibling will result in a Z-interval to hyper-box conversion of all the small Z-intervals. By contrast, going to the parent as in DFS and working with the big Z-interval that corresponds to the sibling node will allow the detection of hyper-boxes that are completely contained in the query box. Therefore, there will be no need to convert any of the Z-intervals in the sibling node to hyper-boxes. Further, there is even no need to test the inclusion any more. Exemplary embodiments thus provide a significant potential savings because each Z-intervals to hyper-box conversion costs hundreds CPU (central processing unit) operations, and very large numbers of such conversions are saved.

As noted, each Z-interval in the parent node is the union of many Z-intervals in a child. The significance of this process increases as the number of children of an inner node (the fan-out) becomes larger. When the fan-out is in hundreds to thousands, working with larger Z-intervals as much as possible is recommended for one exemplary embodiment.

One exemplary embodiment provides another optimized algorithm DFS_b. This algorithm tests the hyper-boxes in the parent node and classifies them into one of three classes: no_intersection with QB, intersection (but not included in) QB, and included in QB. Based on this information, the intervals in the child node can be skipped, sent to output without further examination, or further examined.

Exemplary embodiments check the intersection between a hyper-box and the query box. A hyper-box is both a Z-interval and a box in Cartesian coordinates. In the decomposition algorithm presented above, the hyper-boxes are given by any two neighboring vertices in the sequence with the left boundary closed and the right boundary open. Let $s_i=(s_{i,1}, \ldots, s_{i,n})$ and $t_i=(t_{i,1}, \ldots, t_{i,n})$ be the two vertices on the main diagonal of the ith hyper-box, to translate this Z-interval $[v_i, v_{i+1})$ into Cartesian space, the following is performed:

For each dimension $j$, $s_{i,j}=v_{i,j}$ and $t_{i,j}=v_{i+1,j}$.

This is true because the Z-interval $[v_i, v_{i+1})$ is a hyper-box.

Checking the intersection of two boxes (high-dimensional hyper-rectangular prisms) given in Cartesian coordinates is done dimension-wise. In each dimension, the two boxes are two intervals. The two high-dimensional boxes are not intersecting if and only if in one of the dimensions, the pair of intervals does not intersect. It is a simple matter to check the intersection of two boxes given in Cartesian coordinates.

For the query box, both the left and the right boundaries can be open or closed in each dimension. To keep this information, 2*n indicators (two Boolean vectors) are used:

Bool $a\_boundary\_closed_j, b\_boundary\_closed_j$;
$j=1,\ldots,n$.

One embodiment also uses the following variable that allows more compact code:

int $a\_boundary_j, b\_boundary_j$; $j=1,\ldots,n$ $a\_bounday_j=1$ if the boundary is open, 0 if closed.

To check for non-intersection between a box [s,t] and the query box [a,b]:

Find a $j$, $t_j < a_j + a\_boundary_j$ or $b_j - b\_boundary_j < s_j$.

If non-intersection is false, intersection is detected.

A discussion now turns to ExtractDataItems(theLeaf, QB). The data is extracted by recursively subdividing the Z-interval of the leaf into smaller and smaller hyperboxes until they are either included in or completely excluded from the query box. These two checking algorithms are used in the intersection detection between a hyper-box and the query box. This detection is performed by recursively subdividing the hyper-box into two halves until they are either completely excluded from or completely contained in the query box. This process is possible because if the recursion has to go on, it will eventually reach individual points. One way for doing this subdivision is using the steps of the Z-addresses of the boxes. Each forward operation (subdivision) using a step in the Z-addresses, the current box is subdivided into $2^n$-hquads. An alternative is to subdivide along one dimension at a time and this translates to using one bit in the Z-addresses to divide the current box into two sub-boxes. Each of the sub-boxes is checked against the query box for either exclusion or containment. If one of them returns true, that sub-box is done. If neither returns true, the box is further subdivided into two sub-boxes.

The following is performed in order check for containment:

For all $j$, $a_j+a\_bounday_j \le s_j$ and $t_j \le b_j-b\_bounday_j$.

All the data items in a box that is contained in the query box are returned. The data items contained in a non-intersection box are excluded.

Two issues complicates the checking in the Intersect( ) function:
  a) the vertices of boxes are given in Z-addresses;
  b) there may be up to 2*p hyper-boxes.

For a), converting the Z-address back to Cartesian address requires a linear scan of the bits. While intersection check can also be done with one scan of the bits. Therefore, explicit conversion is not needed.

Since any two consecutive boxes share one vertex and the neighboring two vertices from the decomposition algorithm have similarities, the Intersect( ) function is further optimized by sharing some of the work among different intersection checking.

In one exemplary embodiment, the DFS algorithm does not use sibling links to jump to neighbor leafs to determine whether a bit lies inside the query box. DFS algorithm goes back to the parent node after scanning a child node (even if that child node is a leaf or an inner node). As such, the parent node is on the stack, and the Z-intervals stored in there is ready to be examined, A disk operation is not required to be triggered until a Z-interval intersecting with the QB is identified, which can happen at any level of the tree (by going up to the parent node rather than the sibling).

Figure 5:
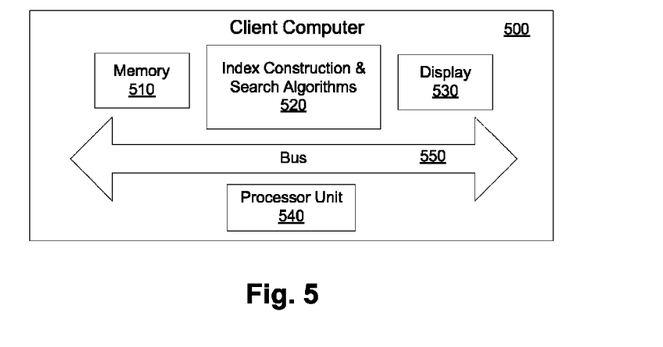
FIG. 5 is a block diagram of a computer for executing methods in accordance with an exemplary embodiment.

FIG. 5 is a block diagram of a client computer or electronic device 500 in accordance with an exemplary embodiment of the present invention. In one embodiment, the computer or electronic device includes memory 510, index construction and search algorithms 520, display 530, processing unit 540, and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The processing unit 540 communicates with memory 510 and algorithms 520 via one or more buses 550 and performs operations and tasks necessary for constructing a multidimensional indexing tree structure that is based on a space filling curve and for ascending and descending a multidimensional database while searching a range query. The memory 510, for example, stores applications, data, programs, algorithms (including software to implement or assist in implementing embodiments in accordance with the present invention) and other data.

As used herein, the term "database" means records or data stored in a computer system such that a computer program or person using a query language can send and/or retrieve records and data from the database. Users pose queries to the database, and records retrieved in the answer to queries contain information that is used to make decisions. Further, a database management system (DBMS) is used to manage and query the database.

As used herein, the term "multidimensional database" or "high dimensional database" means a database wherein data is accessed or stored with more than one attribute (a composite key). Data instances are represented with a vector of values, and a collection of vectors (for example, data tuples) are a set of points in a multidimensional vector space.

As used herein, a "range query" is a query to a multidimensional database wherein the query specifies an interval of values (for example, $(a_i, b_i)$) for each attribute (for example, $A_i$) which the retrieved tuples match. By way of example, the range query is represented with a hyper-box QB in space $\Omega$, and the range query is defined with lower and upper bounds such that the query finds all data tuples inside the query box QB.

As used herein, a "B-tree" is a tree data structure in a database that sorts data and enables searches, insertions, and deletions to occur in logarithmic amortized time. Internal nodes have a variable number of child nodes with all leaf nodes being maintained at a same depth for balance. Further, as used herein, a "UB-Tree" is a balanced tree that stores and retrieves data from a multidimensional database. The UB-Tree is a B+tree (information only in the leaves) and includes records that are stored according to Z-order (curve) wherein Z-order is calculated by bitwise interlacing the keys. Further, as used herein "Z-order" means a space-filling curve that maps multidimensional data in a database to one dimension. The z-value of a point in multi-dimensions is calculated by bitwise interleaving its coordinate values. A one-dimensional data structure can be used, such as binary search trees, B-trees, Skip lists, hash tables, etc.

As used herein, an "indexing structure" is a database index having a data structure that improves the speed of operations in a table. Indexes can be created using one or more columns, providing the basis for both rapid random lookups and efficient ordering of access to records In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    receiving, by a computer, a query box corresponding to a search for multidimensional data in a database;
    examining, by the computer, an intersection between a Z-interval and the query box by decomposing the Z-interval into a sequence of hyper-boxes that are both boxes in Cartesian space and Z-intervals in Z space;
    beginning, by the computer, an ascending phase of a tree structure when the intersection between the query box and the Z-interval of a current node of the tree structure falls into a gap in which no intersection exists in a child of the current node;
    traversing, by the computer, back to an immediate parent node of the current node and starting from a first Z-interval that has not been examined when the ascending phase begins; and
    returning, by the computer, data items discovered for the search.

2. The method of claim 1 further comprising, testing the intersection in a single pass through boundaries of the Z-interval.

3. The method of claim 1 further comprising, constructing the query box to have plural disjoint intervals along a space filling curve.

4. The method of claim 1 further comprising, breaking down the Z-interval of the current node that intersects the query box into plural Z-intervals in child nodes with gaps, wherein the ascending phase begins in response to detecting that the intersection falls into one of the gaps.

5. The method of claim 1 further comprising, continuing to descend to child nodes of the tree structure until no intersection is discovered between the Z interval and the query box, wherein the no intersection is indicated by the intersection between the query box and the Z-interval falling into the gap.

6. A non-transitory computer readable medium comprising a physical media having instructions for causing a computer to:
receive a range query to search multidimensional data in a database;
use the range query to construct a query box having plural disjoint intervals along a space filling curve;
examine an intersection between a Z-interval of a current node of the tree structure and the query box by decomposing the Z-interval into a sequence of hyper-boxes that are also Z-intervals in Z space;
begin an ascending phase of the tree structure when the intersection between the query box and the Z-interval of the current node falls into a gap in which no intersection exists in a child of the current node;
traverse back to an immediate parent node of the current node and start from a first Z-interval that has not been examined when the ascending phase begins; and
discover data items in the query box that satisfy the query.

7. The computer readable medium of claim 6 wherein the instructions when executed further cause the computer to decompose a Z-interval into a sequence of consecutive hyper-boxes that are also Z-intervals.

8. The computer readable medium of claim 6 wherein the instructions when executed further cause the computer to decompose a Z-interval in a single pass.

9. The computer readable medium of claim 6 wherein the instructions when executed further cause the computer to continue a search through nodes in the tree structure without repeating an intersection check on intervals in a child node that are covered by a portion of an interval in a parent node already cleared with the query box.

10. The computer readable medium of claim 6 wherein the range query is a depth-first-search range query.

11. The computer readable medium of claim 6 wherein the instructions when executed further cause the computer to examine an intersection between hyper-boxes and the query box in a parent node to determine when intervals in a child node are skipped, sent to output without further examination, or further examined.

12. The computer readable medium of claim 6 wherein the instructions when executed further cause the computer to determine an intersection between a hyper-box and the query box by recursively subdividing the hyper-box into halves until the halves are completely excluded from or completely contained in the query box.

13. The computer-readable medium of claim 6, wherein the instructions when executed further cause the computer to:
break down the Z-interval of the current node that intersects the query box into plural Z-intervals in child nodes with gaps, where the ascending phase begins in response to detecting that the intersection falls into one of the gaps.

14. A computer, comprising:
a memory storing code;
a processor to execute the code to:
define a query box from a search for multidimensional data in a database;
examine an intersection between a Z-interval and the query box by decomposing the Z-interval into a sequence of hyper-boxes that are also Z-intervals in Z space;
begin an ascending phase of a tree structure when the intersection between the query box and the Z-interval of a current node of the tree structure falls into a gap in which no intersection exists in a child of the current node;
traverse back to an immediate parent node of the current node and start from a first Z-interval that has not been examined when the ascending phase begins;
discover data items in the query box that satisfy the search.

15. The computer of claim 14, wherein the code is executable on the processor to further:
specify the Z-interval by two boundary Z-addresses;
decompose the Z-interval in a single pass through the two boundary Z addresses.

16. The computer of claim 14, wherein the code is executable on the processor to further:
break down the Z-interval of the current node that intersects the query box into plural Z-intervals in child nodes with gaps, wherein the ascending phase begins in response to detecting that the intersection falls into one of the gaps.

* * * * *